(12) United States Patent
Ozawa

(10) Patent No.: US 8,266,251 B2
(45) Date of Patent: *Sep. 11, 2012

(54) COMMUNICATION TERMINAL, DISTRIBUTION SYSTEM, METHOD FOR CONVERSION AND PROGRAM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 12/669,994

(22) PCT Filed: Jul. 29, 2008

(86) PCT No.: PCT/JP2008/063559
§ 371 (c)(1),
(2), (4) Date: Jan. 21, 2010

(87) PCT Pub. No.: WO2009/017105
PCT Pub. Date: Feb. 5, 2009

(65) Prior Publication Data
US 2010/0191832 A1    Jul. 29, 2010

(30) Foreign Application Priority Data
Jul. 30, 2007    (JP) ................. 2007-197577

(51) Int. Cl.
*G06F 15/16* (2006.01)
(52) U.S. Cl. ................................. 709/219
(58) Field of Classification Search .......... 709/200–203, 709/243–253, 217–219
See application file for complete search history.

(56) References Cited

U.S. PATENT DOCUMENTS

| | | | | |
|---|---|---|---|---|
| 5,912,707 A * | 6/1999 | Kim | ................. | 375/240.16 |
| 5,926,674 A * | 7/1999 | Tabb et al. | ................. | 399/231 |
| 5,995,171 A * | 11/1999 | Enari et al. | ................. | 375/240.27 |
| 6,141,448 A * | 10/2000 | Khansari et al. | ................. | 382/236 |
| 6,148,026 A * | 11/2000 | Puri et al. | ................. | 375/240 |
| 6,876,705 B2 * | 4/2005 | Katsavounidis et al. | | 375/240.28 |
| 7,260,150 B2 * | 8/2007 | Katsavounidis et al. | | 375/240.28 |
| 7,305,033 B2 * | 12/2007 | Yamada | ................. | 375/240.16 |
| 2004/0146211 A1 * | 7/2004 | Knapp et al. | ................. | 382/236 |
| 2006/0031915 A1 * | 2/2006 | Winder et al. | ................. | 725/135 |
| 2006/0182052 A1 * | 8/2006 | Yoon et al. | ................. | 370/312 |
| 2008/0079733 A1 * | 4/2008 | Benson et al. | ................. | 345/502 |
| 2008/0180307 A1 * | 7/2008 | Ramo et al. | ................. | 341/200 |
| 2009/0154816 A1 * | 6/2009 | Swazey et al. | ................. | 382/232 |
| 2010/0205322 A1 * | 8/2010 | Ozawa | ................. | 709/246 |
| 2011/0188568 A1 * | 8/2011 | Ozawa | ................. | 375/240.02 |
| 2012/0010882 A1 * | 1/2012 | Thyssen et al. | ................. | 704/226 |

FOREIGN PATENT DOCUMENTS

| | | |
|---|---|---|
| CN | 1976444 A | 6/2007 |
| JP | 2002-300528 A | 10/2002 |
| WO | 2007/043256 A | 4/2007 |

OTHER PUBLICATIONS

Chinese Office Action for CN200880100057.1 issued Jun. 9, 2011.

* cited by examiner

*Primary Examiner* — Asad M Nawaz

(57) ABSTRACT

A communication terminal that receives contents information distributed from a source of distribution, comprises: means for converting a leading frame of said contents information to a non-predicted frame in response to an input request.

14 Claims, 5 Drawing Sheets

(SECOND EXAMPLE)

COMMUNICATION TERMINAL, DISTRIBUTION SYSTEM, METHOD FOR CONVERSION AND PROGRAM

This invention is the National Phase of PCT/JP2008/063559 filed Jul. 29, 2008 which is claiming the priority of JP Patent Application No. 2007-197577 filed on Jul. 30, 2007. The entire contents of the patent application are incorporated herein by reference thereto.

TECHNICAL FIELD

This invention relates to a communication terminal, a distribution system, a method for conversion, and a program, used in receiving the contents information distributed from a source of distribution.

BACKGROUND

Recently, distribution of the multimedia contents, inclusive of moving pictures, still pictures, audio or voice, is spreading in broadband or mobile environments. For distributing the multimedia contents over an IP network to communication terminals, such a distribution system in which the multimedia contents are distributed over a network to the communication terminals by multicast or broadcast, is now under investigation in order to relieve the network of the load.

An example of this type of the distribution system, having a contents server, a multimedia conversion server and a multimedia terminal, is disclosed in Patent Document 1. The multimedia conversion server accesses the contents server to acquire the HTML (Hyper Text Markup Language) and multimedia contents and converts the form of the multimedia contents to the form suitable for communication with the multimedia terminal to re-transmit the contents to the multimedia terminal. The multimedia terminal includes an accessing means for accessing a server on the Internet via the multimedia conversion server, and a means for acquiring the HTML and the multimedia contents from the server via the multimedia conversion server. The multimedia terminal also includes a means for displaying the acquired multimedia contents in response to the HTML acquired.

[Patent Document 1] JP Patent Kokai Publication No. JP-P2001-168923A
[Patent Document 2] JP Patent Kokai Publication No. JP-P2006-203682A

SUMMARY

The entire disclosures of the above Patent Documents 1 and 2 are incorporated herein by reference thereto. The following analysis is given by the present invention.

The above distribution system suffers a problem that, when the terminal side switches the channel of the moving picture contents from CH1 (channel 1) to CH2 (channel 2), for example, the picture of the CH2 cannot be displayed until arrival of a non-predicted frame in a stream.

There is also a problem that, if attempts are made to decode and display the predicted frames before arrival of the non-predicted frame, the picture is severely disturbed. In forming a stream of moving picture contents, the moving pictures are encoded using a moving picture encoder. A time interval for a sequence of non-predicted pictures, is set in this case in order to generate the stream of moving picture contents. If this time interval is T seconds, the non-predicted picture arrives at the terminal only after T seconds in the worst case, with the result that a queuing time of T seconds is produced in the worst case at the time of the channel switching. Hence, there is a possibility that an end user, accustomed to instant channel zapping of an analog TV, feels stressed with this queuing time and proceeds to call interruption without waiting.

It is a principal object of the present invention to provide a distribution system in which, in doing channel switching or channel zapping on the terminal side, the channel switching or channel zapping may be done instantly without queuing time without stressing the end user.

The present invention is summarized substantially as follows, however, without restriction.

In a first aspect, the present invention provides a communication terminal that receives the contents information distributed from a source of distribution, wherein a leading frame of the contents information is converted to a non-predicted frame in response to an input request.

In a second aspect, the present invention provides a system comprising the communication terminal, defined as above, and a distribution server acting as a source of distribution of the contents information to the communication terminal.

In a third aspect, the present invention provides a distribution method in which the contents information distributed from a source of distribution is received and the contents information received is converted. The distribution method comprises the step of converting a leading frame of the contents information to a non-predicted frame in response to an input request.

In a fourth aspect, the present invention provides a computer program for allowing a computer to execute the processing of converting the leading frame of contents information, distributed from a source of distribution, to a non-predicted frame, in response to an input request. The computer makes up a communication terminal and receives the contents information.

According to the present invention, when switching the channels in the same session, such as from CH1 to CH2, the communication terminal converts the leading frame in a stream of the channel after the switching, for instance CH2, to an I frame or an I-coded frame, referred to sometimes a 'non-predicted frame'. It is thus possible to realize instant channel switching, so that there arises no phenomenon that a decoded picture is disturbed for T seconds on the terminal side, as is met in the related art system.

Moreover, the present invention has such a meritorious effect that, since the frames subsequent to the leading frame are output through, that is, without conversion, it is possible to suppress deterioration ascribable to conversion to a small value.

PREFERRED MODES

Figure 1:
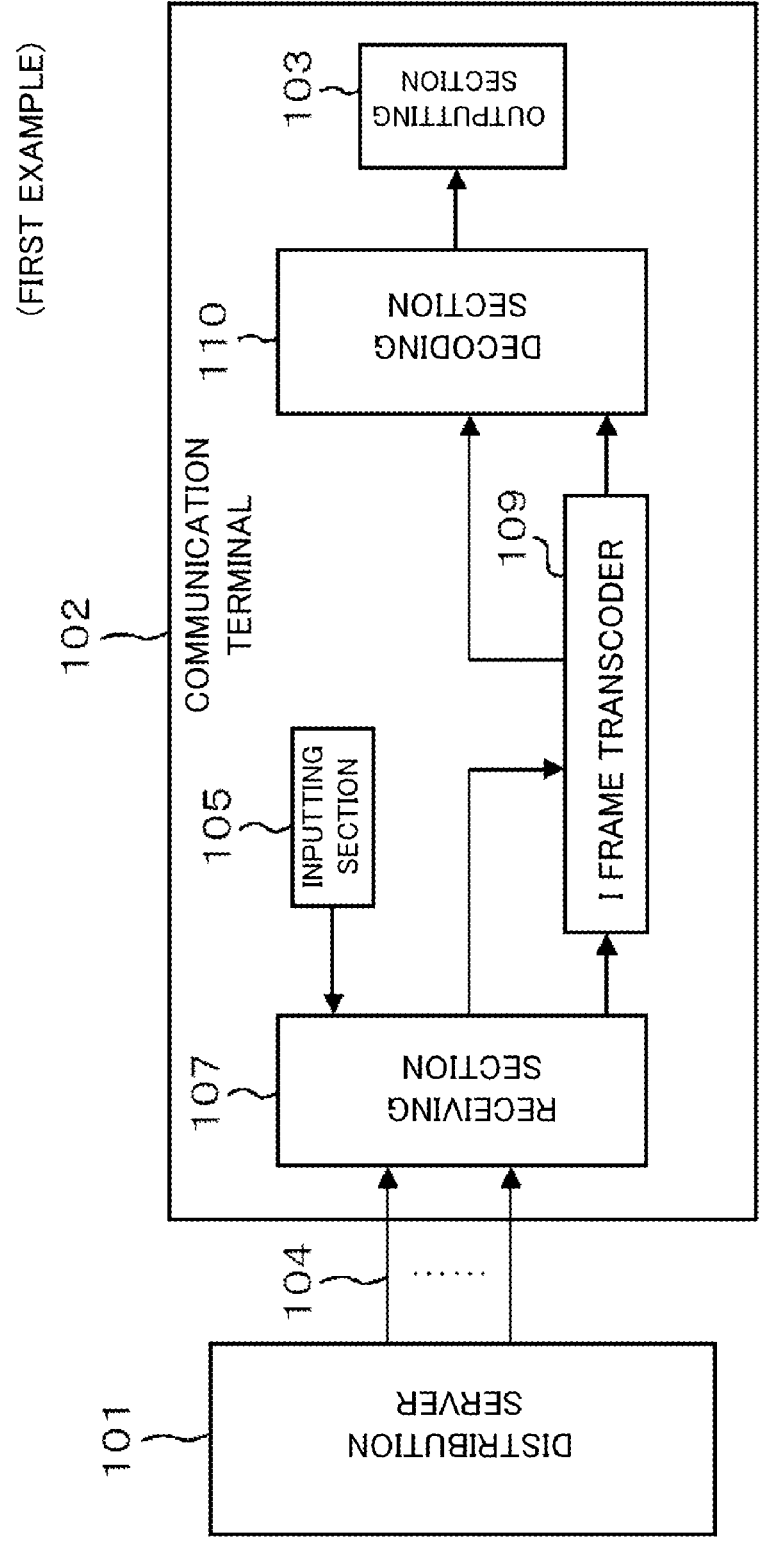
FIG. 1 is a block diagram showing an exemplary formulation of a distribution system according to a first example of the present invention.

A communication terminal, according to an exemplary embodiment of the present invention, receives contents information (e.g., a stream), distributed from a transmission source (which may be formulated by a distribution server 101 of FIG. 1), over a transmission medium (e.g., 104 of FIG. 1). The communication terminal converts a leading frame of the contents information to a non-predicted frame in response to a request (a request for connecting or switching of the contents information) entered by actuation from a user at an inputting section (105 of FIG. 1).

A distribution system, according to the exemplary embodiment of the present invention, includes a communication terminal (102 of FIG. 1) that receives the contents information, such as a stream containing at least one of a moving picture, a still picture, voice and audio, and a distribution server (101 of FIG. 1) that operates as a source of distribution of the contents information to the communication terminal.

A distribution method, according to an exemplary embodiment of the present invention, includes the following steps:
Step 1: receiving the contents information distributed from a source of distribution, such as the distribution server 101 of FIG. 1, over a transmission medium, such as 104 of FIG. 1. The contents information may be a stream containing at least one of a moving picture, a still picture, voice and audio.
Step 2: converting a leading frame of the received contents information to a non-predicted frame, in response to a request as entered, such as a request for connecting or switching of the contents information:

A computer program, according to an exemplary embodiment of the present invention, allows a computer to convert a leading frame of the contents information, such as a stream, to a non-predicted frame in response to a request entered. The computer forms the communication terminal (102 of FIG. 1) that receives the contents information distributed from a source of distribution, such as the distribution server 101 of FIG. 1.

FIRST EXAMPLE

A distribution system according to a first example of the present invention is now described with reference to the drawings. FIG. 1 depicts a block diagram showing a system configuration of a distribution system according to the first example of the present invention.

Referring to FIG. 1, the distribution system of the present example distributes contents (a stream) from a distribution server 101 via a network (transmission route 104) to a communication terminal 102. The present distribution system includes the distribution server 101 and the communication terminal 102.

The distribution server 101 is a server storing the contents information for distribution and which has a computer function.

The communication terminal 102 is able to communicate with the communication server 101 and also has a computer function. When a request for stream connection or stream switching is made by an inputting operation from a user, the communication terminal 102 converts a leading frame of the stream to a non-predicted frame, while outputting frames other than the leading frame through, that is, in an unconverted state.

The following is the manner of the operation of the distribution system. It is presupposed that a plural number, for example, n, of compressed encoded bit streams of contents, inclusive of videos, have been pre-stored in the distribution server 101.

Initially, the distribution server 101 distributes the n compressed encoded bit streams to the communication terminal 102, over a transmission route 104, using the multicast protocol or the broadcast protocol.

A receiving section 107 of the communication terminal 102 receives the n compressed encoded bit streams from the distribution server 101.

In case a stream connection request is made by the communication terminal 102, an inputting section 105 of the communication terminal 102 decides at least one CH, for example, CH1, for distribution, out of the n (n CH) contents, subject to a user's inputting operation, in order to request the distribution server 101 to make channel connection. The so determined channel information is supplied to the receiving section 107.

The receiving section 107 then transmits, based on the channel information received by the inputting section 105, one of the n compressed encoded bit streams, which is relevant to a channel corresponding to the channel information, and the information necessary for decoding the compressed encoded bit stream (Decoder Configuration Information, DCI), to an I frame transcoder 109.

Then, when supplied with the compressed encoded bit stream and the DCI from the receiving section 107, the I frame transcoder 109 converts a leading frame in the compressed encoded bit stream to an I frame (non-predicted frame) to generate a compressed encoded bit stream, the leading frame of which has been converted to the I frame. The so generated compressed encoded bit stream and the DCI are sent to a decoding section 110. It should be noted that frames other than the leading frame of the compressed encoded bit stream remain unconverted.

The decoding section 110 decodes the compressed encoded bit stream, supplied from the I frame transcoder 109, with the DCI, supplied from the I frame transcoder, and sends the signal, obtained on decoding, to an outputting section 103. It should be noted that the compressed encoded bit stream and the DCI are those relevant to the selected channel.

The outputting section 103 supplies outputs based on signals from the decoding section 110. The output include displaying video signals, such as moving picture or still picture signals, and voice-output voice or audio signals.

On the other hand, if a stream switching request is made from the communication terminal 102, the communication terminal 102 receives or selects the channel switching information, for example, the information for switching from CH1 to CH2, at the inputting section 105, subject to a user's operating input, in order to request the distribution server 101 to make the channel switching. The communication terminal delivers the input channel switching information to the receiving section 107.

The receiving section 107 then transmits, based on the channel switching information received from the inputting section 105, one of the n compressed encoded bit streams, which is relevant to the channel corresponding to the channel switching information, e.g., CH2, and the information necessary for decoding the compressed encoded bit stream (Decoder Configuration Information, DCI), to the I frame transcoder 109.

Next, when supplied with the compressed encoded bit stream and the DCI from the receiving section 107, the I frame transcoder 109 converts the leading frame in the compressed encoded bit stream to an I frame (non-predicted frame), to generate a compressed encoded bit stream, the leading frame of which has been converted to the I frame. The I frame transcoder then transmits the compressed encoded bit stream, the leading frame of which has been converted to the I frame, and the DCI, to the decoding section 110. It should be noted that frames other than the leading frame of the compressed encoded bit stream remain unconverted.

Next, the decoding section 110 decodes the compressed encoded bit stream the DCI from the I frame transcoder N9. The decoding section delivers the decoded signal to the outputting section 103. It should be noted that the DCI, supplied to the decoding section, are those relevant to the selected channel.

The outputting section 103 supplies outputs based on the signals from the decoding section 110. These outputs include video display signals, such as moving picture signal or still picture signal, and/or voice signals for voice or audio.

According to the present example, in case the channel is switched in the same session, for example, from CH1 to CH2, the I frame transcoder 109 of the communication terminal 102 converts the leading frame of the stream of the channel following the channel switching, e.g., CH2, to an I frame, thereby realizing instantaneous channel switching. In addition, it is possible to prevent the decoded image on the terminal side from being disturbed for T seconds as is the case with the aforementioned related art system. Further, the I frame transcoder 109 outputs frames next following the leading frame through, that is, without conversion, with the result that deterioration ascribable to conversion may be suppressed to small values.

SECOND EXAMPLE

Figure 2:
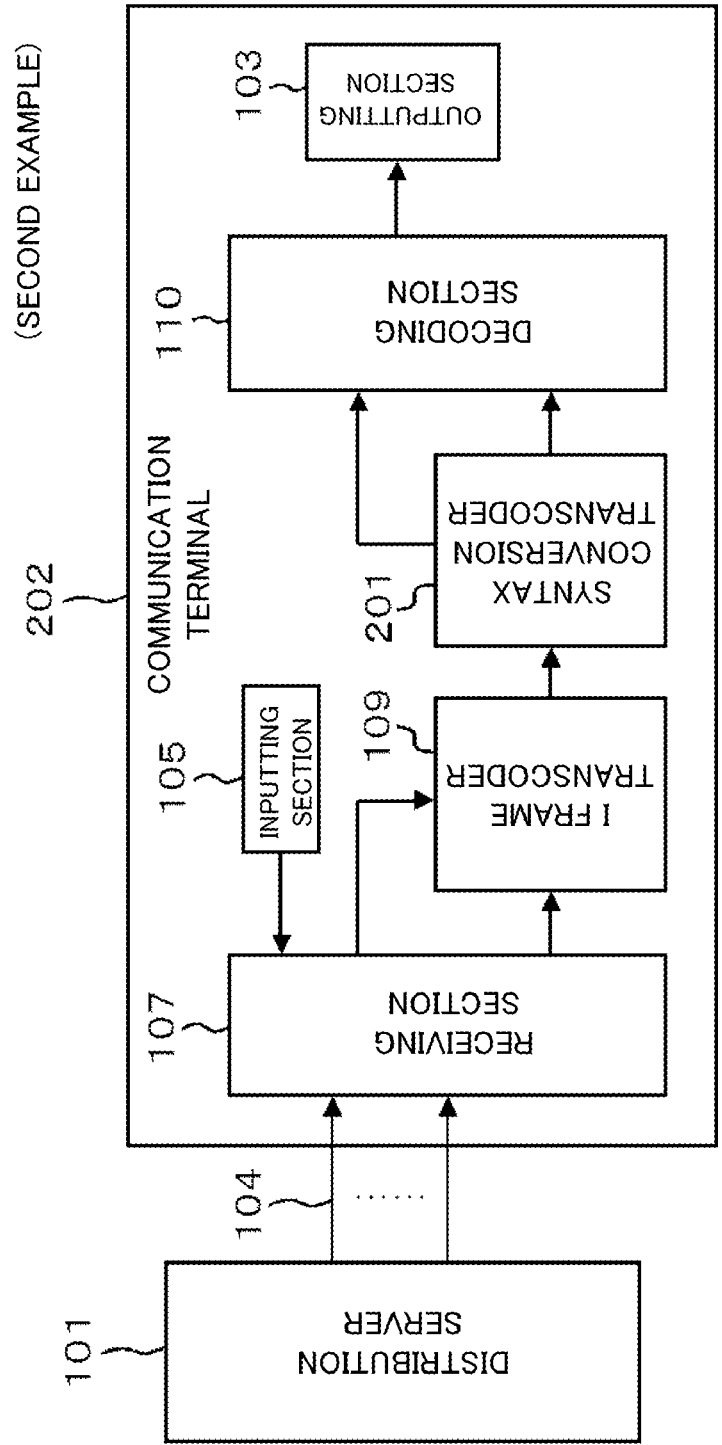
FIG. 2 is a block diagram showing an exemplary formulation of a distribution system according to a second example of the present invention.

A distribution system according to a second example of the present invention is now described with reference to the drawings. FIG. 2 depicts a block diagram showing a system configuration of a distribution system according to the second example of the present invention.

Referring to FIG. 2, a communication terminal 202 of the distribution system according to the second example includes a syntax conversion transcoder 201 between the I frame transcoder 109 and the decoding section 110. When supplied with the compressed encoded bit stream and the DCI from the I frame transcoder 109, the syntax conversion transcoder 201 converts the syntax of the compressed encoded bit stream, insofar as the leading frame and at least one of the next following frames of the compressed encoded bit stream are concerned, depending on the contents of the DCI received. The syntax conversion transcoder 201 then outputs the so syntax-converted compressed encoded bit stream to the decoding section 110. The present second example is otherwise the same as the above-described first example.

The operation of the distribution system of the present example is now described. In the following, the description of the portion of the operation which is the same as the operation of the distribution system of the first example is dispensed with.

The receiving section 107 of the communication terminal 202 transmits, based on the channel switching information, supplied from the inputting section 105, one of the n compressed encoded bit streams, which is relevant to the channel corresponding to the channel switching information, such as CH2, and the information needed for decoding the compressed encoded bit stream (Decoder Configuration Information, DCI), to the I frame transcoder 109.

When supplied with compressed encoded bit stream and the DCI from the receiving section 107, the I frame transcoder 109 generates a compressed encoded bit stream, the leading frame of which has been converted to an I frame (non-predicted frame), and transmits the so compressed encoded bit stream, the leading frame of which has been converted to the I frame, and the DCI, to the syntax conversion transcoder 201. It should be noted that frames other than the leading frame of the compressed encoded bit stream remain unconverted.

When supplied from the I frame transcoder 109 with the compressed encoded bit stream and the DCI, for example, DCI for CH2, the syntax conversion transcoder 201 verifies whether or not the DCI of the CH2 is the same as that of the CH1.

If it is verified that the DCI of the CH2 is the same as that of the CH1, the syntax conversion transcoder 201 transmits the compressed encoded bit stream from the I frame transcoder 109 to the decoding section 110 without applying frame syntax conversion of the compressed encoded bit stream supplied from the I frame transcoder.

If it is verified that the DCI of the CH2 is not the same as that of the CH1, the syntax conversion transcoder 201 converts the syntax of the leading frame and at least one of the succeeding frames of the compressed encoded bit stream supplied from the I frame transcoder 109, so that the DCI for CH2 will be the same as the DCI for CH1. The syntax conversion transcoder then transmits the so syntax-converted compressed encoded bit stream to the decoding section 110.

Figure 3:
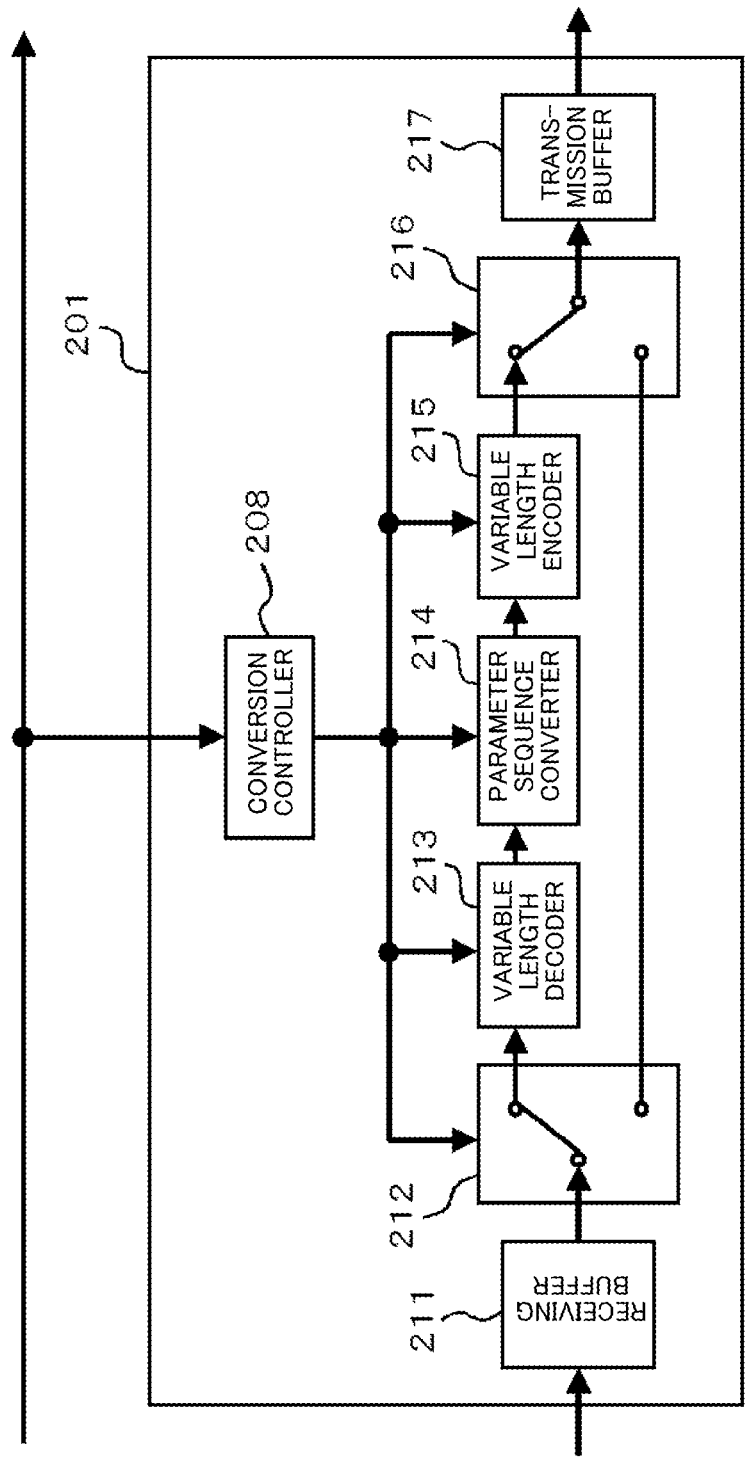
FIG. 3 is a block diagram showing an exemplary formulation of a syntax conversion transcoder of the distribution system according to the second example of the present invention.

The formulation of the syntax conversion transcoder of FIG. 2 is now described. FIG. 3 depicts a detailed block diagram showing an exemplary formulation of the syntax conversion transcoder of FIG. 2.

Referring to FIG. 3, the syntax conversion transcoder 201 includes a conversion controller 208, a receiving buffer 211, a switching section 212, a variable length decoder 213, a parameter sequence converter 214, a variable length encoder 215, a switching section 216 and a transmission buffer 217. These will now be explained in detail.

The conversion controller 208 receives the DCI from the I frame transcoder (109 of FIG. 2), and compares the DCI (DCI after conversion) to the DCI before conversion, which is stored in the conversion controller 208, in order to verify whether or not the syntax is to be converted. The conversion controller transmits the ultimate conversion control information to the switching section 212, variable length decoder 213, parameter sequence converter 214, variable length encoder 215 and to the switching section 216.

The compressed encoded bit stream from the I frame transcoder (109 of FIG. 2), which is a video packet of moving picture data, is stored once in the receiving buffer 211.

The switching section 212 switches between doing syntax conversion of the compressed encoded bit stream from the receiving buffer 211 (video packet) and not doing the syntax conversion of the compressed encoded bit stream, based on the conversion control information from the conversion controller 208.

In case of doing the syntax conversion, the state of the switching section 212 is such that the compressed encoded bit stream from the receiving buffer 211 (video packet) is supplied to the variable length decoder 213.

In case of not doing the syntax conversion, the state of the switching section 212 is such that the compressed encoded bit stream from the receiving buffer 211 (video packet) is supplied via the switching section 216 to the transmission buffer 217.

The variable length decoder 213 performs variable length decoding of parameters, other than A.C. components, of the compressed encoded bit stream from the switching section 212 (video packet), usually using a VLC (variable length coding) code table. The variable length decoder 213 controls the variable length decoding in accordance with the conversion control information from the conversion controller 208.

If the variable length decoder 213 does not use RVLC (Reversible Variable Length Code) for the A.C. components, it performs variable length decoding, usually using the VLC code table, not shown. If the variable length decoder uses the RVLC, it performs variable length decoding, using a RVLC code table, also not shown.

The variable length decoder 213 delivers a compressed encoded bit stream (video packet), as obtained on variable length decoding, to the parameter sequence converter 214.

The parameter sequence converter 214 re-arrays a bit sequence of the compressed encoded bit stream (video packet), delivered after variable length decoding from the variable length decoder 213. The parameter sequence converter 214 controls the processing of re-arraying the bit sequence in accordance with the conversion control information from the conversion controller 208. The parameter sequence converter 214 delivers the compressed encoded bit stream (video packet), the bit sequence of which has been re-arrayed, to the variable length encoder 215.

The variable length encoder 215 variable length encodes only A.C. components of parameters of the compressed encoded bit stream (video packet), obtained on bit sequence re-arraying by the parameter sequence converter 214. The variable length encoder 215 controls the processing of the variable length encoding, in accordance with the conversion control information from the conversion controller 208.

If the variable length encoder 215 does not use the RVLC, it performs the variable length decoding, usually using a VLC code table, not shown. If the variable length decoder uses the RVLC, it performs the variable length decoding, using a RVLC code table, also not shown.

The variable length encoder 215 delivers the compressed encoded bit stream (video packet), obtained on variable length encoding, to the switching section 216.

The switching section 216 switches between doing syntax conversion and not doing syntax conversion of the compressed encoded bit stream (video packet) obtained on variable length encoding from the variable length encoder 215, in accordance with the conversion control information from the conversion controller 208. In case of doing the syntax conversion, the switching section 216 delivers the compressed encoded bit stream (video packet) from the variable length encoder 215 to the transmission buffer 217 and, if otherwise, delivers the compressed encoded bit stream (video packet) from the switching section 212 to the transmission buffer 217.

As to the detailed structure of the syntax conversion transcoder of FIG. 3, see also the description of Patent Document 2 in the name of the present Applicant (or Assignee).

The transmission buffer 217 stores the compressed encoded bit stream (video packet) from the switching section 216 once and subsequently delivers the so stored compressed encoded bit stream to the decoding section (110 of FIG. 2).

The present example gives a meritorious result similar to that of the first example. In addition, when desired to switch from a given channel to another channel in the same session, the syntax of the stream after the switching is converted. Hence, session re-connection is unneeded, in contract to the conventional technique, described above, so that only a short time suffices to switch from a given channel, such as CH1, to another channel, such as CH2.

THIRD EXAMPLE

Figure 4:
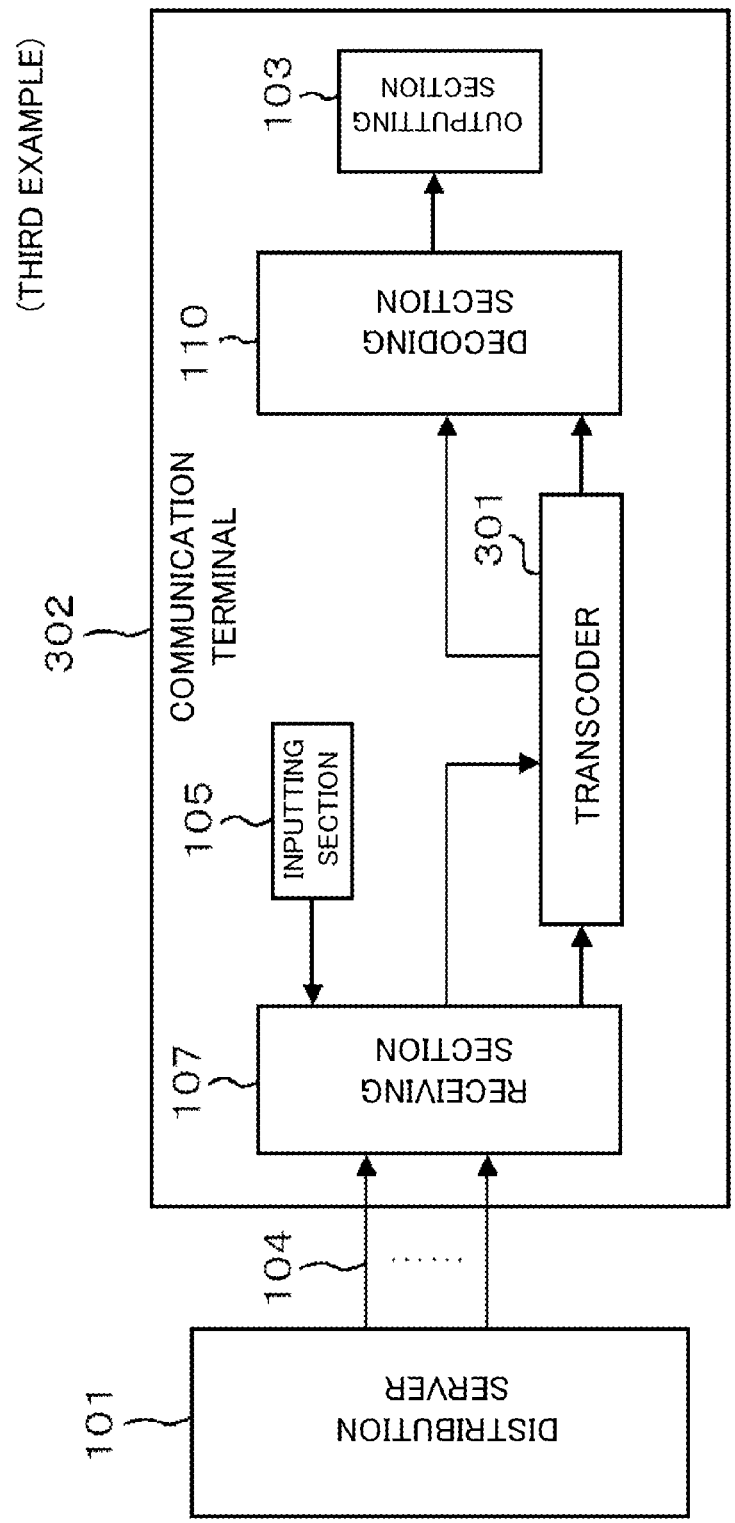
FIG. 4 is a block diagram showing an exemplary formulation of a distribution system according to a third example of the present invention.

A distribution system according to a third example of the present invention is now described with reference to the drawings. FIG. 4 depicts a block diagram showing a system configuration of a distribution system according to the third example of the present invention.

Referring to FIG. 4, the distribution system according to the third example of the present invention includes, in a communication terminal 302, a transcoder 301 in place of the I frame transcoder (109 of FIG. 1) of the first example. When supplied with the compressed encoded bit stream and the DCI from the receiving section 107, the transcoder 301 converts a leading frame of the bit stream to an I frame (non-predicted frame), while converting at least one of succeeding frames following the leading frame to a P frame (sometimes referred to as predicted frame), to generate an as-converted compressed encoded bit stream. The transcoder 301 sends the as-converted compressed encoded bit stream and the DCI to the decoding section 110. In other respects, the present third example is similar to the first example.

The following is the operation of the distribution system of the third example. It should be noted that the portion of the operation which is the same as the operation of the distribution system of the first example is dispensed with.

In case a request for stream connection is made from the communication terminal 302, the communication terminal 302 decides at least one of the n compressed encoded bit streams, which is to be distributed, such as CH1, by the inputting section 105, in order to make a connection request to the distribution server 101, subject to the user's actuation. The inputting section 105 sends the so set channel information to the receiving section 107.

The receiving section 107 then transmits, based on the channel information from the inputting section 105, one of the n compressed encoded bit streams, which is relevant to the channel corresponding to the channel information, and the information necessary for decoding the compressed encoded bit streams (Decoder Configuration Information, DCI), to the transcoder 301.

On receipt of the compressed encoded bit stream and the DCI from the receiving section 107, the transcoder 301 converts a leading frame in the compressed encoded bit stream to an I frame (non-predicted frame), while converting frames succeeding to the leading frame to P frames (predicted frames), to generate an as-converted compressed encoded bit stream. The transcoder then transmits the as-converted compressed encoded bit stream and the DCI to the decoding section 110.

The decoding section 110 then decodes the compressed encoded bit stream from the transcoder 301, based on the DCI from the transcoder 301, and transmits the signal, resulting from the decoding, to the outputting section 103. It should be noted that the compressed encoded bit stream and the DCI are those relevant to the selected channel.

When a stream switching request is made from the communication terminal 302, the inputting section 105 of the communication terminal 302 inputs, that is, selects, the channel switching information of switching from the CH1 to the CH2, for example, subject to actuation by the user, in order to request the distribution server 101 to make channel switching. The input channel information is supplied to the receiving section 107.

The receiving section 107 transmits, based on the channel switching information received from the inputting section 105, one of the n compressed encoded bit streams which is relevant to the channel corresponding to the channel information (e.g., CH2), and the information needed to decode the compressed encoded bit stream (Decoder Configuration Information, DCI) to the transcoder 301.

When supplied with the compressed encoded bit stream and the DCI, relevant to CH2, from the receiving section 107, the transcoder 301 once decodes the bit stream with the DCI for the CH2 to generate a picture signal. The transcoder then re-encodes the picture signal, obtained on decoding, using the DCI for the CH1, to generate a compressed encoded bit stream in which the leading frame has been re-encoded to an I frame (non-predicted frame) and in which the frames succeeding to the leading frame of the compressed encoded bit stream have been re-encoded to P frames (predicted frames). The transcoder transmits the re-encoded bit stream and the DCI for the CH1 to the decoding section 110.

When supplied with the compressed encoded bit stream and with the DCI for the CH1 from the transcoder 301, the decoding section 110 decodes the compressed encoded bit stream, based on the DCI, to generate a decoded signal, which is supplied to the outputting section 103. It should be noted that the compressed encoded bit stream and the DCI are those relevant to the selected channel.

Figure 5:
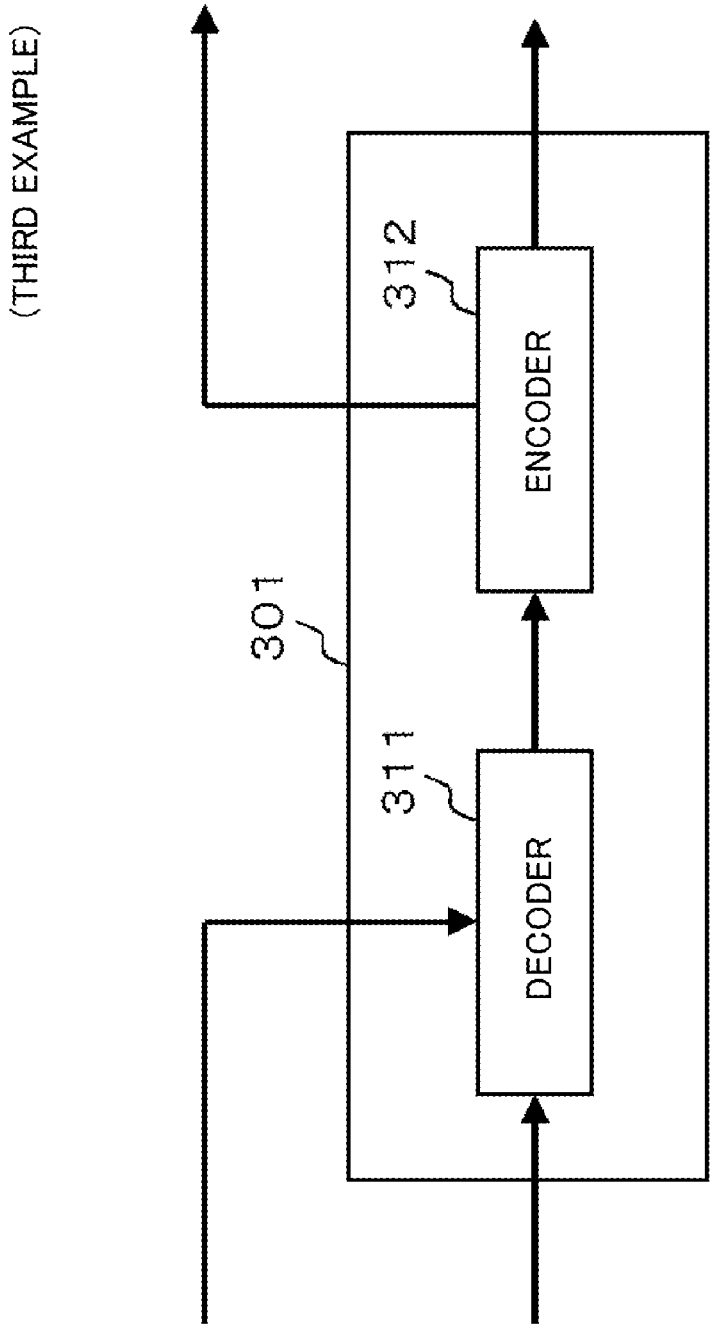
FIG. 5 is a block diagram showing an exemplary formulation of a transcoder of the distribution system according to the third example of the present invention.

The formulation of the transcoder of the present example is now described. FIG. 5 depicts a block diagram showing the formulation of the transcoder of the communication terminal of FIG. 4.

Referring to FIG. 5, the transcoder 301 includes a decoder 311 and an encoder 312.

When supplied with the DCI and the compressed encoded bit stream from the receiving section (107 of FIG. 4), the decoder 311 sets the DCI to decode the compressed encoded bit stream, and delivers the decoded moving picture signal to the encoder 312.

The encoder 312 sets the decoding method, based on the DCI, following the conversion, and receives the decoded signal to re-encode it. The encoder then delivers the re-encoded bit stream and the DCI after the conversion to the decoding section (110 of FIG. 4).

The present example yields the meritorious effect similar to that of the first example.

It should be noted that, in the first to third examples, the compressed encoded bit stream is assumed to be a stream encoded with MPEG-4, and that the decoding section 110 is an MPEG-4 decoder. However, other encoding systems, e.g., H.263 or H.264, may also be used.

In the present invention, there are various possible modes, which are listed below, however, without restriction.

Mode 1: A distribution system according to the second aspect i.e., comprising: the communication terminal according to the first aspect; and a distribution server as a source of distribution of the contents information to the communication terminal.

Mode 2: In the distribution system according to Mode 1, the communication terminal receives a stream containing at least one of moving picture, still picture, voice and audio from the distribution server over a network by multicast or broadcast; and in case a request is made for connecting or switching an input stream, the communication terminal converts the leading frame of the stream to a non-predicted frame and outputs frames other than the leading frame in an unconverted state.

Mode 3: In the distribution system according to Mode 1, the communication terminal receives a stream containing at least one of moving picture, still picture, voice and audio from the distribution server over a network by multicast or broadcast; and in case a request is made for connecting or switching an input stream, the communication terminal converts the leading frame of the stream to a non-predicted frame, outputs frames other than the leading frame in an unconverted state, converts syntax of a stream insofar as the leading frame and at least one of succeeding frames are concerned, and outputs the resulting stream.

Mode 4: In the distribution system according to Mode 1, the communication terminal receives a stream containing at least one of moving picture, still picture, voice and audio from the distribution server over a network by multicast or broadcast; and in case a stream connecting request or a stream switching request is made from the terminal, the communication terminal converts the leading frame of the stream to a non-predicted frame and outputs frames other than the leading frame in an unconverted state; the communication terminal converting at least one of frames succeeding to the leading frame to a predicted frame or frames.

Mode 5: A distribution method according to the third aspect.

Mode 6: In the distribution method according to Mode 5, frames of the contents information other than the leading frame are output in an unconverted state.

Mode 7: In the distribution method according to Mode 5, the leading frame of the contents information is converted to a non-predicted frame, in response to a request for switching the input contents information; it is then verified whether or not the decoding information before switching the contents information is the same as the decoding information after switching the contents information, and if the decoding information before switching the contents information is not the same as the decoding information after switching the contents information, syntax of the leading frame and at least one of frames in the contents information succeeding to the leading frame is converted so that the decoding information before switching the contents information will be the same as the decoding information after switching the contents information.

Mode 8: In the distribution method according to Mode 5, in response to a request from the destination of distribution, the leading frame is converted to a non-predicted frame, and frames other than the leading frame are output in an unconverted state; and at least one of the succeeding frames is converted to a predicted frame.

Mode 9: A program, that allows a computer to execute the processing, according to the fourth aspect.

Mode 10: The program according to Mode 9 allows the computer to execute the processing of: outputting frames of the contents information other than the leading frame to the destination of distribution in an unconverted state.

Mode 11: The program according to Mode 9 allows the computer to execute the processing of: converting the leading frame of the contents information to a non-predicted frame, in response to a request for switching the contents information; verifying whether or not the decoding information before switching the contents information is the same as the decoding information after switching the contents information; and converting, if the decoding information before switching is not the same as the decoding information after switching, syntax of the leading frame and at least one of the succeeding frames in the contents information so that the decoding information before switching will be the same as the decoding information after switching.

Mode 12: The program according to Mode 9 allows the computer to execute the processing of: converting the leading frame to a non-predicted frame, in response to an input request, outputting frames other than the leading frame in an unconverted state, and converting at least one of succeeding frames to a predicted frame.

The disclosures of the above-listed Patent Documents are to be incorporated herein by reference thereto. The examples or examples can be changed or adjusted within the framework of the entire disclosures of the present invention, inclusive of the claims, based on the fundamental technical concept of the invention. Various combinations or selections of disclosed elements are also possible within the framework of the claims of the present invention. That is, the present invention naturally comprises various changes or modifications that may be made by those skilled in the art based on the entire disclosures, inclusive of claims, and on its technical concept.

The invention claimed is:

1. A communication terminal that receives contents information distributed from a source of distribution, comprising:
    a receiving section that receives an input request and the contents information distributed from said source of distribution;
    a transcoder that decodes the contents information received from said receiving section, subsequently encodes the decoded contents information and outputs the resulting contents information;
    a decoding section that decodes the contents information from said transcoder; and
    an outputting section that outputs a signal decoded by said decoding section, wherein
    said transcoder that converts a leading frame of said contents information from said receiving section to a non-predicted frame in response to the input request,
    wherein frames other than the leading frame of said contents information are output in an unconverted state;
    said non-predicted frame or said frames output in the unconverted state are decoded and output in the decoded state; and
    said request is a request for connecting or switching the contents information, and
    in case of receipt of said input request, said receiving section provides said transcoder with information for decoding the contents information.

2. The communication terminal according to claim 1 further comprising:
    means for converting syntax, wherein
    after converting the leading frame of said contents information to a non-predicted frame, in response to an input request of switching the contents information, verification is performed whether or not the decoding information before switching the contents information is the same as the decoding information after switching the contents information; and
    said syntax converting means converts, in case said decoding information before switching the contents information is not the same as the decoding information after switching the contents information, the syntax of said leading frame and at least one of succeeding frames in said contents information so that the decoding information before switching the contents information will be the same as the decoding information after switching the contents information.

3. The communication terminal according to claim 2 wherein
    in case the decoding information before switching is the same as that after switching, said contents information is output to said destination of distribution without converting the syntax of said leading frame and said succeeding frame or frames.

4. The communication terminal according to claim 2 further comprising:
    a receiving section that receives an input request and the contents information distributed from said source of distribution;
    a first transcoder that decodes the contents information received by said receiving section, encoding the decoded contents information and outputting the resulting contents information;
    a second transcoder that decodes the contents information received by said first transcoder, encoding the decoded contents information and outputting the resulting contents information;
    a decoding section that decodes the contents information from said second transcoder; and
    an outputting section that outputs the contents information from said decoding section.

5. The communication terminal according to claim 4 wherein
    on receipt of said input request, said receiving section provides said first transcoder and said second transcoder with the decoding information (DCI);
    said first transcoder converts the leading frame of said contents information from said receiving section to a non-predicted frame; and
    said second transcoder verifies, in case said input request is a request for switching the contents information, whether or not the decoding information before switching of said contents information output from said first transcoder is the same as the decoding information after switching of said contents information;
    said second transcoder converting, in case the decoding information before switching of said contents information is not the same as the decoding information after switching of said contents information, the syntax of said leading frame and at least one of succeeding frames in said contents information so that the decoding information before switching of said contents information will be the same as the decoding information after switching of said contents information.

6. The communication terminal according to claim 4 wherein said second transcoder includes:
    a conversion controller that compares the encoding information as set by said receiving section to the encoding information before said setting to output the conversion control information that decides on whether or not the syntax is to be converted;
    a receiving buffer that stores the contents information from said first transcoder once;
    a first switching section that switches between converting the syntax in the contents information from said receiving buffer and not converting the syntax in said contents information, in accordance with said conversion control information from said conversion controller;
    a variable length decoding section that variable-length-decodes parameters other than A.C. components of the contents information from said first switching section, in accordance with said conversion control information from said conversion controller, using a first code table in case of not using Reversible Variable Length Code RVLC; said variable length decoding section doing said variable length decoding using a second code table different from said first code table in case of using RVLC;
    a parameter sequence converting section that re-arrays said bit sequence of said contents information from said variable length decoder in accordance with said conversion control information from said conversion controller;

a variable length encoding section that variable-length-encodes parameters of A.C. components of the contents information from said parameter sequence converting section, in accordance with said conversion control information from said conversion controller, using said first code table in case of not using RVLC; said variable-length-encoding section doing said variable length encoding using said second code table in case of using RVLC;

a second switching section that switches between converting the syntax in the contents information from said variable length encoder and not converting the syntax in said contents information, in accordance with said conversion control information from said conversion controller; and a transmission buffer that once stores the contents information from said second switching section and thereafter outputs the contents information stored to said decoding section.

7. The communication terminal according to claim 1 wherein,
in response to said input request, the leading frame is converted to a non-predicted frame;
wherein frames other than said leading frame are output in an unconverted state; and wherein at least one of the succeeding frames is converted to a predicted frame or frames.

8. The communication terminal according to claim 7 comprising:
a receiving section that receives the input request and the contents information distributed from said source of distribution;
a transcoder that decodes the contents information from said receiving section, encodes the decoded contents information and outputs the resulting contents information;
a decoding section that decodes the contents information from said transcoder; and
an outputting section that outputs the contents information from said decoding section.

9. The communication terminal according to claim 8 wherein
said receiving section provides said transcoder with the decoding information (DCI), on receipt of said input request; and
said transcoder converts the leading frame of said contents information from said receiving section to a non-predicted frame; said transcoder converting frames succeeding to said leading frame to predicted frames.

10. The communication terminal according to claim 1, wherein the information distributed from said source of distribution includes a stream containing at least one of moving picture, still picture, voice and audio.

11. The communication terminal according to claim 1, wherein the information distributed from said source of distribution is received by a multicast protocol or a broadcast protocol.

12. The communication terminal according to claim 11, wherein, in case of receipt of the information distributed from said source of distribution, the multicast protocol or the broadcast protocol is changed to a uni-cast protocol.

13. A distribution system comprising:
the communication terminal according to claim 1; and
a distribution server as a source of distribution of the contents information to said communication terminal.

14. A distribution method in which the contents information distributed from a source of distribution is received and the contents information received is converted; said distribution method comprising the step of:
converting a leading frame of said contents information to a non-predicted frame in response to an input request,
wherein frames other than the leading frame of said contents information are output in an unconverted state;
said non-predicted frame or said frames output in the unconverted state are decoded and output in the decoded state; and
said request is a request for connecting or switching the contents information, wherein
said distribution method further comprises:
receiving the input request and the contents information distributed from said source of distribution;
decoding the contents information that have been received, subsequently encoding the decoded contents information and out s outputting the resulting contents information;
further decoding the contents information that have been decoded; and
outputting a signal resulting from said further decoding, wherein
in case of receipt of said input request, providing information for decoding the contents information that have been received, and
converting the leading frame of said contents information that have been received to a non-predicted frame.

* * * * *